(12) United States Patent
Sampath et al.

(10) Patent No.: US 9,249,270 B2
(45) Date of Patent: Feb. 2, 2016

(54) EXPANDABLE PELLETIZED MATERIALS BASED ON POLYESTER

(75) Inventors: Bangaru Dharmapuri Sriramulu Sampath, Ludwigshafen (DE); Olaf Kriha, Frankenthal (DE); Holger Ruckdäschel, St. Martin (DE); Philippe Desbois, Edingen-Neckarhausen (DE); Freddy Gruber, Offenbach (DE); Klaus Hahn, Kirchheim (DE)

(73) Assignee: BASF SE, Ludwigshafen (DE)

( * ) Notice: Subject to any disclaimer, the term of this patent is extended or adjusted under 35 U.S.C. 154(b) by 197 days.

(21) Appl. No.: 13/209,761

(22) Filed: Aug. 15, 2011

(65) Prior Publication Data

US 2012/0041086 A1 Feb. 16, 2012

Related U.S. Application Data

(60) Provisional application No. 61/373,279, filed on Aug. 13, 2010.

(51) Int. Cl.
| | |
|---|---|
| *C08J 9/16* | (2006.01) |
| *C08J 9/12* | (2006.01) |
| *C08J 9/00* | (2006.01) |
| *C08J 9/232* | (2006.01) |
| *C08J 9/228* | (2006.01) |
| *C08K 5/01* | (2006.01) |

(52) U.S. Cl.
CPC .............. *C08J 9/0061* (2013.01); *C08J 9/0038* (2013.01); *C08J 9/12* (2013.01); *C08J 9/228* (2013.01); *C08K 5/01* (2013.01); *C08J 2201/03* (2013.01); *C08J 2367/02* (2013.01); *C08J 2425/04* (2013.01); *C08J 2471/12* (2013.01)

(58) Field of Classification Search
USPC ................................................ 521/56, 59, 60
See application file for complete search history.

(56) References Cited

U.S. PATENT DOCUMENTS

| | | | |
|---|---|---|---|
| 3,651,014 A | | 3/1972 | Witsiepe |
| 4,022,719 A | | 5/1977 | Okuyama et al. |
| 4,148,846 A | | 4/1979 | Owens et al. |
| 4,269,964 A | | 5/1981 | Freitag et al. |
| 4,288,561 A | * | 9/1981 | Craft et al. ...................... 521/90 |
| 4,396,742 A | | 8/1983 | Binsack et al. |
| 4,544,677 A | * | 10/1985 | Allen et al. ...................... 521/91 |
| 4,584,360 A | | 4/1986 | Paul et al. |
| 4,732,949 A | | 3/1988 | Paul et al. |
| 4,771,109 A | | 9/1988 | Eichenauer et al. |
| 4,873,289 A | | 10/1989 | Lindner et al. |
| 4,882,381 A | | 11/1989 | Wittmann et al. |
| 5,010,135 A | | 4/1991 | Eckel et al. |
| 5,158,985 A | | 10/1992 | Kohler et al. |
| 5,256,702 A | | 10/1993 | Grigat et al. |
| 5,496,887 A | | 3/1996 | Braune |
| 5,744,517 A | * | 4/1998 | Chung .......................... 523/136 |
| 6,214,897 B1 | * | 4/2001 | Tung et al. ..................... 521/138 |
| 6,573,308 B1 | | 6/2003 | Braun et al. |
| 2007/0112082 A1 | * | 5/2007 | Hahn ...................... C08J 9/0066 521/60 |
| 2013/0150468 A1 | | 6/2013 | Fussi et al. |

FOREIGN PATENT DOCUMENTS

| | | |
|---|---|---|
| DE | 2842005 A1 | 4/1980 |
| DE | 3334782 A1 | 10/1984 |
| DE | 35 06 472 A1 | 8/1986 |
| DE | 3725576 A1 | 2/1989 |
| DE | 3800603 A1 | 7/1989 |
| DE | 4401055 A1 | 7/1995 |
| DE | 19938008 A1 | 2/2001 |
| EP | 0 050 265 A1 | 4/1982 |
| EP | 0 208 187 A2 | 1/1987 |
| EP | 235690 A2 | 9/1987 |
| EP | 0319290 A2 | 6/1989 |
| EP | 0365916 A1 | 5/1990 |
| EP | 0711810 A1 | 5/1996 |
| JP | 2001329103 A | 11/2001 |
| WO | WO-2011063806 A1 | 6/2011 |
| WO | WO-2011086030 A2 | 7/2011 |

OTHER PUBLICATIONS

International Search Report for PCT/EP2011/063900, dated Oct. 25, 2011.

* cited by examiner

*Primary Examiner* — Kara Boyle
(74) *Attorney, Agent, or Firm* — Drinker Biddle & Reath LLP

(57) ABSTRACT

An expandable pelletized material comprising
A) a polymer matrix composed of
  A1) at least 55% by weight of polyester (based on the entirety of components A1) and A2)) with a total enthalpy of fusion of up to 60 J/g, optionally of one or more melting points in the range from 100 to 300° C. and of one or more glass transition temperatures in the range from 0 to 250° C., and
  A2) from 0 to 45% by weight (based on the entirety of components A1) and A2)) of one or more thermoplastic polymers different from component A1);
B) a physical blowing agent component, and
C) optionally further additives
is suitable for producing moldable foams for use in the automobile industry, airline industry, construction industry, packaging industry, sports and leisure industry, in transport, in engineering, in lightweight construction, and/or in composite construction.

17 Claims, No Drawings

EXPANDABLE PELLETIZED MATERIALS BASED ON POLYESTER

CROSS-REFERENCE TO RELATED APPLICATIONS

This application claims benefit (under 35 USC 119(e)) of U.S. Provisional Application 61/373,279, filed Aug. 13, 2010 which is incorporated by reference.

BACKGROUND OF THE INVENTION

The invention relates to an expandable pelletized material based on polyester, to moldable foams and foam moldings obtainable therefrom, to processes for producing these, and also to the use of the same as structural foam and/or insulation foam.

Foams based on polyester have a comparatively small range of applications, because of problems in process technology and because of densities that are usually high in comparison with polystyrene foams or with polyurethane foams.

Low-density polyester foams are known by way of example from U.S. Pat. No. 4,022,719. U.S. Pat. No. 5,256,702 describes extruded foam sheets based on a mixture made of polycarbonate and polyethylene terephthalate.

U.S. Pat. No. 5,158,985 discloses polycarbonate foams which were foamed via depressurization of a pelletized material in contact with $CO_2$ under pressure.

Despite these advances, there remains a high level of demand for expandable pelletized polyester materials and polyester foams, where these exhibit not only low density but also good processibility. Moldable foams here feature extensive freedom in the shaping of the foam components, and provide a high level of resource conservation in use, since the density of the foam, and thus the amount of raw material required, and the properties of the foam, can be adjusted during the prefoaming process. These foam beads can then be foamed to give slabs or complex moldings in a single operation.

A SUMMARY OF THE INVENTION

It has been found that use of a polyester in which crystallinity, glass transition temperature, and melting point lie within a particular range can give an expandable pelletized polyester material which can be expanded in a simple manner, using steam, to give low-density foams.

The invention therefore provides an expandable pelletized material comprising
A) a polymer matrix composed of
  A1) at least 55% by weight of polyester (based on the entirety of components A1) and A2)) with a total enthalpy of fusion of up to 60 J/g, optionally of one or more melting points in the range from 100 to 300° C. and of one or more glass transition temperatures in the range from 0 to 250° C., and
  A2) from 0 to 45% by weight (based on the entirety of components A1) and A2)) of one or more thermoplastic polymers different from component A1);
B) a physical blowing agent component, and
C) optionally further additives.

The invention further provides a process for producing the pelletized material of the invention, comprising the following steps:
a) provision of the polyester A1) or precursors thereof and optionally of polymer component A2) in a molten state,
b) mixing to incorporate physical blowing agent component B) and optionally one or more additives C) into the melt,
c) extrusion, and
d) underwater pelletization of the melt containing blowing agent, preferably under increased pressure.

The invention further provides a moldable polyester foam obtainable via prefoaming of the pelletized material of the invention, and also provides foam moldings obtainable via expansion and pressing of the moldable polyester foam.

The invention further provides the use of the moldable polyester foam of the invention in the automobile industry, airline industry, construction industry, packaging industry, in transport, in lightweight construction, and/or in composite construction.

A DETAILED DESCRIPTION OF THE INVENTION

The foams of the invention provide numerous advantages.
It is possible to produce foams in the density range from 300 g/L to 10 g/L.
It is possible to produce foam components with very smooth surfaces and with homogeneous fusion of the foam beads within the molding.
High heat resistance is achieved. The foam components can be stored at 120° C. for at least 6 h without any observable heat-shrinkage. This is not achievable either with EPS or with EPP foams.

Because the raw material can be processed in commercially available prefoamers (for EPS), and because the resultant prefoamed foam beads can be further processed to give moldings in commercially available machinery (for EPP), this is a drop-in solution. The resultant foams markedly exceed the heat resistance of EPS and indeed of EPP. These properties open up novel applications, in particular in fields which demand relatively high usage temperatures, for insulation, or else in the form of load bearing components.

The moldable foams are more environmentally friendly than commercial extruded foams, because they provide higher transport efficiency. Moldable foams can moreover be processed in a single operation to give complex components. Extruded foams often need mechanical working, which produces offcuts. Moldable foams moreover feature isotropic mechanical properties.

The pelletized material of the invention comprises a polyester A1) with crystallinity up to 40%, with a glass transition temperature in the range from 0 to 250° C., and optionally with a melting point in the range from 100 to 300° C.

The term "polyester" in the invention designates thermoplastics of which the repeat units are characterized by an ester group. The term therefore comprises not only homopolymers, i.e. polyesters composed of one acid component and of one alcohol component, of one hydroxycarboxylic acid component, or of one lactone component, and also copolymers, i.e. polyesters composed of at least two acid components and/or alcohol components, and/or hydroxycarboxylic acid components, and/or lactone components. Polyesters for the purposes of the invention are not only traditional polyesters, i.e. polycarboxylic esters, but also polycarbonates, i.e. polycarbonic esters, and also mixed forms, such as polyestercarbonates and polyethercarbonates.

The polyester A1) of the invention involves a homo- or copolyester, or a mixture made of a plurality of homo- and/or copolyesters, with the proviso that the mixture satisfies the abovementioned conditions in respect of enthalpy of fusion, glass transition temperature, and optionally melting point.

Total enthalpy of fusion >0 J/g means that the corresponding polyester of the invention comprises to some extent crystalline domains which—in the region of said crystalline domains—have both a glass transition temperature and a melting point. "Total enthalpy of fusion" means that the crystalline domains of semicrystalline polyesters can have different enthalpies of fusion, but the total of said enthalpies of fusion, i.e. the total enthalpy of fusion, is ≤60 J/g. In the case of polybutylene terephthalate (PBT), the maximum total enthalpy of fusion corresponds to a level of semicrystallinity which is about 40%. Polyester component A1) of the invention can also be amorphous, i.e. can have an enthalpy of fusion of 0 J/g. In that case, component A1) has no melting point. The expression "optionally a melting point in the range from 100 to 300° C." therefore means that component A1) has a corresponding melting point in its crystalline domains if it is not amorphous. One or more melting points means that, because of possible different constitution of domains, it is also possible that different melting points occur, but all of these are within the abovementioned range. Analogous considerations apply to the glass transition temperatures.

Total enthalpy of fusion is preferably in the range from 1 to 37.5 J/g, particularly preferably from 4.5 to 30 J/g.

In the case of semicrystalline polymers, the melting point(s) is/are in the range from 10 to 300° C., preferably in the range from 130 to 290° C., particularly preferably from 150 to 280° C.

The glass transition temperature(s) is/are preferably in the range from 25 to 170° C., particularly preferably from 50 to 150° C.

Preference is therefore given to polyesters A1) with a total enthalpy of fusion in the range from 1.5 to 37.5 J/g, melting points in the range from 130 to 290° C., and glass transition temperatures in the range from 25 to 170° C.

Preference is further given to polyesters A1) with a total enthalpy of fusion in the range from 1.5 to 37.5 J/g, melting points in the range from 100 to 300° C., and glass transition temperatures in the range from 0 to 250° C.

Preference is further given to polyesters A1) with a total enthalpy of fusion in the range from 1.5 to 37.5 J/g, melting points in the range from 130 to 290° C., and glass transition temperatures in the range from 0 to 250° C.

Preference is further given to polyesters A1) with a total enthalpy of fusion in the range from 1.5 to 37.5 J/g, melting points in the range from 100 to 300° C., and glass transition temperatures in the range from 25 to 170° C.

Preference is further given to polyesters A1) with a total enthalpy of fusion up to 60 J/g, optionally melting points in the range from 130 to 290° C., and glass transition temperatures in the range from 25 to 170° C.

Preference is further given to polyesters A1) with a total enthalpy of fusion up to 60 J/g, optionally melting points in the range from 100 to 290° C., and glass transition temperatures in the range from 25 to 170° C.

Preference is further given to polyesters A1) with a total enthalpy of fusion up to 60 J/g, optionally melting points in the range from 130 to 290° C., and glass transition temperatures in the range from 0 to 250° C.

Particular preference is given to polyesters A1) with a total enthalpy of fusion in the range from 4.5 to 30 J/g, melting points in the range from 130 to 250° C., and glass transition temperatures in the range from 50 to 150° C.

Particular preference is further given to polyesters A1) with a total enthalpy of fusion in the range from 4.5 to 30 J/g, a melting point in the range from 150 to 280° C., and glass transition temperatures in the range from 0 to 250° C.

Particular preference is given to polyesters A1) with a total enthalpy of fusion in the range from 4.5 to 30 J/g, melting points in the range from 150 to 280° C., and glass transition temperatures in the range from 25 to 170° C.

Particular preference is given to polyesters A1) with a total enthalpy of fusion in the range from 4.5 to 30 J/g, melting points in the range from 150 to 280° C., and glass transition temperatures in the range from 0 to 250° C.

Particular preference is given to polyesters A1) with a total enthalpy of fusion in the range from 4.5 to 30 J/g, melting points in the range from 130 to 290° C., and glass transition temperatures in the range from 50 to 150° C.

Particular preference is given to polyesters A1) with a total enthalpy of fusion in the range from 4.5 to 30 J/g, melting points in the range from 130 to 290° C., and glass transition temperatures in the range from 25 to 170° C.

Particular preference is given to polyesters A1) with a total enthalpy of fusion in the range from 4.5 to 30 J/g, melting points in the range from 130 to 290° C., and glass transition temperatures in the range from 0 to 250° C.

Particular preference is given to polyesters A1) with a total enthalpy of fusion in the range from 4.5 to 30 J/g, melting points in the range from 100 to 300° C., and glass transition temperatures in the range from 50 to 150° C.

Particular preference is given to polyesters A1) with a total enthalpy of fusion in the range from 4.5 to 30 J/g, melting points in the range from 100 to 300° C., and glass transition temperatures in the range from 25 to 170° C.

Particular preference is given to polyesters A1) with a total enthalpy of fusion in the range from 4.5 to 30 J/g, melting points in the range from 100 to 300° C., and glass transition temperatures in the range from 0 to 250° C.

Particular preference is given to polyesters A1) with a total enthalpy of fusion in the range from 1.6 to 37.5 J/g, melting points in the range from 150 to 280° C., and glass transition temperatures in the range from 50 to 150° C.

Particular preference is given to polyesters A1) with a total enthalpy of fusion in the range from 1.5 to 37.5 J/g, melting points in the range from 150 to 280° C., and glass transition temperatures in the range from 25 to 170° C.

Particular preference is given to polyesters A1) with a total enthalpy of fusion in the range from 1.5 to 37.5 J/g, melting points in the range from 150 to 280° C., and glass transition temperatures in the range from 0 to 250° C.

Particular preference is given to polyesters A1) with a total enthalpy of fusion up to 60 J/g, optionally melting points in the range from 150 to 280° C., and glass transition temperatures in the range from 50 to 150° C.

Particular preference is further given to polyesters A) with a total enthalpy of fusion in the range from 1.5 to 37.5 J/g, optionally melting points in the range from 150 to 280° C., and glass transition temperatures in the range from 25 to 170° C.

Particular preference is further given to polyesters A1) with a total enthalpy of fusion up to 60 J/g, optionally melting points in the range from 150 to 280° C., and glass transition temperatures in the range from 0 to 250° C.

Particular preference is further given to polyesters A1) with a total enthalpy of fusion in the range from 1.5 to 37.5 J/g, melting points in the range from 150 to 280° C., and glass transition temperatures in the range from 50 to 150° C.

Particular preference is further given to polyesters A1) with a total enthalpy of fusion in the range from 1.5 to 37.5 J/g, melting points in the range from 100 to 300° C., and glass transition temperatures in the range from 50 to 150° C.

Particular preference is further given to polyesters A1) with a total enthalpy of fusion up to 60 J/g, optionally melting points in the range from 150 to 280° C., and glass transition temperatures in the range from 50 to 150° C.

Particular preference is further given to polyesters A1) with a total enthalpy of fusion up to 60 J/g, optionally melting points in the range from 100 to 300° C., and glass transition temperatures in the range from 50 to 150° C.

Total enthalpy of fusion is determined in the invention with the aid of dynamic differential calorimetry (DSC, differential scanning calorimetry) to ISO 11357-7, using heating and cooling rates of 20 K/min.

Melting point is determined in the invention to ISO 11357-3 using heating and cooling rates of 20 K/min.

Glass transition temperature is determined in the invention to ISO 11357-2 using heating and cooling rates of 20 K/min.

The polyester A1) used can be known homo- and/or copolyester types which have the property profile demanded, some of these being commercially available.

It is also possible to produce copolyesters which have the property profile demanded via appropriate mixing of various monomeric acid components and/or of various alcohol components in conjunction with the process of the invention. To this end, for example, acid monomers and alcohol monomers (or lactones and hydroxyacids) which in the form of homopolyester have excessive crystallinity, an example being PBT, can be mixed with other monomeric components which in the form of homopolyester form structures which are amorphous or which have very low crystallinity, an example being polycarbonate, and these can be reacted to give a copolyester of the invention.

Other suitable polyesters A1) are various copolyesters based on more than two monomers, examples being AB/X, AB/X/Y, X/Y/Z, $A_1B_1/A_2B_2$, $A_1B_1/A_2B_2/A_3B_3$, $A_1B_1/A_2B_2/X$, where A, $A_1$, $A_2$, $A_3$=identical or different $C_2$-$C_{18}$-dialcohols,
B, $B_1$, $B_2$, $B_3$=identical or different $C_2$-$C_{18}$-diacid, and
X, Y, and Z=identical or different $C_4$-$C_{14}$-lactone or $C_4$-$C_{14}$-hydroxycarboxylic acid.

In another, preferred variant, the polyester A1) used in the invention is a copolyester and is produced via transesterification of corresponding polyesters. Any of the known transesterification methods are suitable for this purpose, for example those described in Kunststoff Handbuch [L. A. Utracki, Polymer Blends Handbook, Volume 1, Kluwer Academic Publishers].

Particular preference is given to reactive mixing (blending) of the respective polyesters, in particular immediately prior to melt impregnation with the blowing agent component.

Particularly suitable materials for this variant are mixtures made of various semicrystalline polyesters or of semicrystalline and amorphous polyesters, which are reacted via transesterification in the melt to give the (co)polyesters A1) used in the invention.

Use is generally made of polyesters A1) based on aromatic or aliphatic dicarboxylic acids and on aliphatic or aromatic dihydroxy compounds.

A first group of preferred polyesters is that of polyalkylene terephthalates having in particular from 2 to 10 carbon atoms in the alcohol moiety.

Polyalkylene terephthalates of this type are known per se and are described in the literature. Their main chain comprises an aromatic ring which derives from the aromatic dicarboxylic acid. There may also be substitution in the aromatic ring, e.g. by halogen, such as chlorine or bromine, or by $C_1$-$C_4$-alkyl groups, such as methyl, ethyl, iso- or n-propyl, or n-, iso- or tert-butyl groups.

These polyalkylene terephthalates may be produced by reacting aromatic dicarboxylic acids, or their esters or other ester-forming derivatives, with aliphatic dihydroxy compounds in a manner known per se.

Preferred dicarboxylic acids are 2,6-naphthalenedicarboxylic acid, terephthalic acid and isophthalic acid or mixtures of these. Up to 30 mol %, preferably not more than 10 mol %, of the aromatic dicarboxylic acids may be replaced by aliphatic or cycloaliphatic dicarboxylic acids, such as adipic acid, azelaic acid, sebacic acid, dodecanedioic acids and cyclohexanedicarboxylic acids.

Preferred aliphatic dihydroxy compounds are diols having from 2 to 6 carbon atoms, in particular 1,2-ethanediol, 1,3-propanediol, 1,4-butanediol, 1,6-hexanediol, 1,4-hexanediol, 1,4-cyclohexanediol, 1,4-cyclohexanedimethanol and neopentyl glycol, and mixtures of these.

Particularly preferred polyesters (A1) are polyalkylene terephthalates derived from alkanediols having from 2 to 6 carbon atoms. Among these, particular preference is given to polyethylene terephthalate, polypropylene terephthalate and polybutylene terephthalate, and mixtures of these. Preference is also given to PET and/or PBT which comprise, as other monomer units, up to 1% by weight, preferably up to 0.75% by weight, of 1,6-hexanediol and/or 2-methyl-1,5-pentanediol.

The intrinsic viscosity of the polyesters (A1) is generally in the range from 50 to 220, preferably from 80 to 160 (measured in 0.5% strength by weight solution in a phenol/o-dichlorobenzene mixture in a ratio by weight of 1:1 at 25° C.) to ISO 1628.

Particular preference is given to polyesters whose carboxy end group content is up to 100 kg of polyester, preferably up to 50 meq/kg of polyester and in particular up to 40 meq/kg of polyester. Polyesters of this type may be produced, for example, by the process of DE-A 44 01 055. The carboxy end group content is usually determined by titration methods (e.g. potentiometry).

It is more advantageous to use PET recyclates (also termed scrap PET) optionally in a mixture with polyalkylene terephthalates, such as PBT.

Recyclates are generally:

1) those known as post-industrial recyclates: these are production wastes during polycondensation or during processing, e.g. sprues from injection molding, start-up material from injection molding or extrusion, or edge trims from extruded sheets or films.
2) post-consumer recyclates: these are plastics items which are collected and treated after utilization by the end consumer. Blow-molded PET bottles for mineral water, soft drinks and juices are easily the predominant items in terms of quantity.

Both types of recyclate may be used either as regrind or in the form of pellets. In the latter case, the crude recycled materials are isolated and purified and then melted and pelletized using an extruder. This usually facilitates handling and free-flowing properties, and metering for further steps in processing.

The recycled materials used may either be pelletized or in the form of regrind. The edge length should not be more than 10 mm and should preferably be less than 8 mm.

Because polyesters undergo hydrolytic cleavage during processing (due to traces of moisture) it is advisable to predry the recycled material. Residual moisture content after drying is preferably <0.2%, in particular <0.05%.

Another group to be mentioned is that of fully aromatic polyesters deriving from aromatic dicarboxylic acids and aromatic dihydroxy compounds.

Suitable aromatic dicarboxylic acids are the compounds previously described for the polyalkylene terephthalates. The mixtures preferably used are made from 5 to 100 mol % of isophthalic acid and from 0 to 95 mol % of terephthalic acid, more particularly mixtures of about 80% of terephthalic acid with 20% of isophthalic acid to approximately equivalent mixtures of these two acids.

The aromatic dihydroxy compounds preferably have the general formula

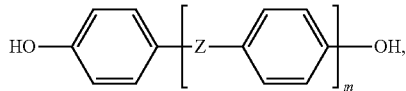

in which Z is an alkylene or cycloalkylene group having up to 8 carbon atoms, an arylene group having up to 12 carbon atoms, a carbonyl group, a sulfonyl group, an oxygen atom or sulfur atom, or a chemical bond, and in which m has the value from 0 to 2. The phenylene groups in the compounds may also have substitution by $C_1$-$C_6$-alkyl groups or alkoxy groups, and fluorine, chlorine, or bromine.

Examples of parent compounds for these compounds are dihydroxybiphenyl, di(hydroxyphenyl)alkane, di(hydroxyphenyl)cycloalkane, di(hydroxyphenyl)sulfide, di(hydroxyphenyl)ether, di(hydroxyphenyl)ketone, di(hydroxyphenyl) sulfoxide, α,α'-di-(hydroxyphenyl)dialkylbenzene, di(hydroxyphenyl)sulfone, di(hydroxybenzoyl)-benzene, resorcinol, and hydroquinone, and also the ring-alkylated and ring-halogenated derivatives of these.

Among these, preference is given to 4,4'-dihydroxybiphenyl, 2,4-di(4'-hydroxyphenyl)-2-methylbutane, α,α'-di(4-hydroxy-phenyl)-p-diisopropylbenzene, 2,2-di(3'-methyl-4'-hydroxyphenyl)propane, and 2,2-di-(3'-chloro-4'-hydroxyphenyl)propane,
and in particular to
2,2-di(4'-hydroxyphenyl)propane, 2,2-di(3',5-dichlorodihydroxyphenyl)propane, 1,1-di-(4'-hydroxyphenyl)cyclohexane, 3,4'-dihydroxybenzophenone, 4,4'-dihydroxydiphenyl sulfone and 2,2-di(3',5'-dimethyl-4'-hydroxyphenyl)propane or a mixture of these.

it is, of course, also possible to use mixtures of polyalkylene terephthalates and fully aromatic polyesters. These generally comprise from 20 to 98% by weight of the polyalkylene terephthalate and from 2 to 80% by weight of the fully aromatic polyester.

It is, of course, also possible to use polyester block copolymers, such as copolyetheresters. Products of this type are known per se and are described in the literature, e.g. in U.S. Pat. No. 3,651,014. Corresponding products are also available commercially, e.g. Hytrel® (DuPont).

Examples of other suitable polyesters are PEN, (N=naphthalene), PBN, PBST (S=succinic acid), e.g. Ecoflex® (BASF SE), PBS, PBSA (A=adipic acid), PLA (polylactide), PHB (polyhydroxybutyrate), PBSE (SE=sebacic acid), polycaprolactones, Tritan (Eastman), and polyester urethanes.

Polycarbonates are also polyesters in the invention. Examples of suitable polycarbonates are those based on biphenols of the general formula

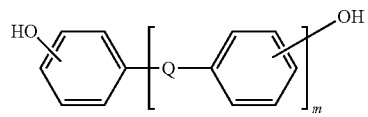

in which Q is a single bond, a $C_1$-$C_8$-alkylene group, a $C_2$-$C_3$-alkylidene group, a $C_3$-$C_6$-cycloalkylidene group, a $C_6$-$C_{12}$-arylene group, or else —O—, —S— or —$SO_2$—, and m is an integer from 0 to 2.

The phenylene radicals of the biphenols may also have substituents, such as $C_1$-$C_6$-alkyl or $C_1$-$C_6$-alkoxy.

Examples of preferred biphenols of the formula are hydroquinone, resorcinol, 4,4'-dihydroxydiphenyl, 2,2-bis(4-hydroxyphenyl)propane, 2,4-bis(4-hydroxyphenyl)-2-methylbutane and 1,1-bis(4-hydroxyphenyl)cyclohexane. Particular preference is given to 2,2-bis(4-hydroxyphenyl) propane and 1,1-bis(4-hydroxyphenyl)cyclohexane, and also to 1,1-bis(4-hydroxyphenyl)-3,3,5-trimethylcyclohexane.

Either homopolycarbonates or copolycarbonates are suitable as component A1, and preference is given to the copolycarbonates of bisphenol A, as well as to bisphenol A homopolymer.

Suitable polycarbonates may be branched in a known manner, specifically and preferably by incorporating from 0.05 to 2.0 mol %, based on the total of the biphenols used, of at least trifunctional compounds, for example those having three or more phenolic OH groups.

Polycarbonates which have proven particularly suitable have relative viscosities $\eta_{rel}$ of from 1.10 to 1.50, in particular from 1.25 to 1.40. This corresponds to an average molar mass $M_w$ (weight average) of from 10 000 to 200 000 g/mol, preferably from 20 000 to 80 000 g/mol.

The biphenols of the general formula are known per se or can be produced by known processes.

The polycarbonates may, for example, be produced by reacting the biphenols with phosgene in the interfacial process, or with phosgene in the homogeneous-phase process (known as the pyridine process), and in each case the desired molecular weight is achieved in a known manner by using an appropriate amount of known chain terminators. (In relation to polydiorganosiloxane-containing polycarbonates see, for example, DE-A 33 34 782.)

Examples of suitable chain terminators are phenol, p-tert-butylphenol, or else long-chain alkylphenols, such as 4-(1,3-tetramethylbutyl)phenol, as in DE-A 28 42 005, or monoalkylphenols, or dialkylphenols with a total of from 8 to 20 carbon atoms in the alkyl substituents, as in DE-A 35 06 472, such as p-nonylphenyl, 3,5-di-tert-butylphenol, p-tert-octylphenol, p-dodecylphenol, 2-(3,5-dimethylheptyl)phenol and 4-(3,5-dimethylheptyl)phenol.

For the purposes of the present invention, halogen-free polycarbonates are polycarbonates made from halogen-free biphenols, from halogen-free chain terminators and optionally from halogen-free branching agents, where the content of subordinate amounts at the ppm level of hydrolyzable chlorine, resulting, for example, from the production of the polycarbonates with phosgene in the interfacial process, is not regarded as meriting the term halogen-containing for the purposes of the invention. Polycarbonates of this type with contents of hydrolyzable chlorine at the ppm level are halogen-free polycarbonates for the purposes of the invention.

Other suitable components A1) which may be mentioned are amorphous polyester carbonates, where phosgene has been replaced, during the preparation, by aromatic dicarboxylic acid units, such as isophthalic acid and/or terephthalic acid units, an example being APEC (Bayer MaterialScience AG). For further details reference may be made at this point to EP-A 711 810.

Other suitable copolycarbonates with cycloalkyl radicals as monomer units have been described in EP-A 365 916.

It is also possible to replace bisphenol A by bisphenol TMC. Polycarbonates of this type are obtainable with trademark APEC HT (E) from Bayer MaterialScience AG.

Other suitable polycarbonates are aliphatic polycarbonates, such as polypropylene carbonate, polyethylene carbonate, or PO/EO+CO/$CO_2$ The starting material used can comprise phosgene, diphosgene, triphosgene, or organic carbonates, preference being given here to organic carbonates.

The radical R of the organic carbonates (A1) used as starting material of the general formula $RO(CO)_n OR$ respectively involve, independently of one another, a straight-chain or branched aliphatic, aromatic/aliphatic, or aromatic hydrocarbon radical having from 1 to 20 carbon atoms. The two radicals R can also have bonding to one another with formation of a ring. It is preferable that an aliphatic hydrocarbon radical is involved, and it is particularly preferable that a straight-chain or branched alkyl radical having from 1 to 5 carbon atoms, or a substituted or unsubstituted phenyl radical, is involved.

In particular, simple carbonates of the formula $RO(CO)_n OR$ are used; n is preferably from 1 to 3, in particular 1.

Dialkyl or diaryl carbonates can by way of example be produced from the reaction of aliphatic, araliphatic, or aromatic alcohols, preferably monoalcohols, with phosgene. They can also moreover be produced by way of oxidative carbonylation of the alcohols or phenols by means of CO in the presence of noble metals, oxygen, or $NO_x$. For production methods for diaryl or dialkyl carbonates, see also "Ullmann's Encyclopedia of Industrial Chemistry", 6th Edition, 2000 Electronic Release, Verlag Wiley-VCH.

Examples of suitable carbonates comprise aliphatic, aromatic/aliphatic, or aromatic carbonates such as ethylene carbonate, propylene 1,2- or 1,3-carbonate, diphenyl carbonate, ditolyl carbonate, dixylyl carbonate, dinaphthyl carbonate, ethylphenyl carbonate, dibenzyl carbonate, dimethyl carbonate, diethyl carbonate, dipropyl carbonate, dibutyl carbonate, diisobutyl carbonate, dipentyl carbonate, dihexyl carbonate, dicyclohexyl carbonate, diheptyl carbonate, dioctyl carbonate, didecyl carbonate, or didodecyl carbonate.

Examples of carbonates where n is greater than 1 comprise dialkyl dicarbonates such as di(tert-butyl)dicarbonate, or dialkyl tricarbonates, such as di(tert-butyl)tricarbonate.

It is preferable to use aliphatic carbonates, in particular those where the radicals comprise from 1 to 5 carbon atoms, an example being dimethyl carbonate, diethyl carbonate, dipropyl carbonate, dibutyl carbonate, or diisobutyl carbonate.

Preference is given, as component A1), to a mixture made of a polycarboxylic ester and of a polycarbonate, and in particular to the product of reactive extrusion of this type of mixture.

Particular preference is given to a mixture made of one or more polycarbonates selected from bisphenol A polycarbonate (PC) and polypropylene carbonate (PPC), and of one or more polycarboxylic esters selected from polyethylene terephthalate (PET), polypropylene terephthalate (PPT), polybutylene terephthalate (PBT), and copolyesters thereof, and/or to transesterification products of said mixture.

Particular preference is given to the mixtures PC/PET, PC/PPT, PC/PBT, PPC/PET, PPC/PPT, PPC/PBT, and to transesterification products thereof.

In one preferred embodiment, the polymer matrix A) consists of polyester component A1), i.e. A2)=0%.

The pelletized material of the invention comprises, as component A2), optionally up to 45% by weight (based on the entirety of components A1) and A2)) of one or more thermoplastic polymers different from component A1).

Component A2) is preferably not miscible with polyester component A1), with consequent formation of domains of components A1) and A2). If the pelletized material of the invention comprises both components, the polyester component properties in the invention can therefore be determined via measurements on domains of polyester component A1). It is preferable that component A2) does not involve polycondensates.

In one preferred embodiment, the pelletized material of the invention comprises from 0.1 to 20% by weight, particularly preferably from 0.4 to 15% by weight, in particular from 1 to 12% by weight (based on the entirety of components A1) and A2)) of one or more thermoplastic polymers A2), in particular of one or more styrene polymers (see below).

In another embodiment, component A2) comprises inert polymers which exhibit higher blowing agent solubility than the polyester A1) and thus serve as blowing agent reservoir. Addition of this type of component A2) preferably permits production of foams with low density, preferably in the range around 25 to 100 g/l.

Preference is given, as component A2), to styrene polymers, polyacrylates, polyolefins, polysulfones, polyether sulfones, polyphenylene ethers, and blends made of two or more of said polymers.

Particular preference, as component A2), is given to styrene polymers and/or blends of these with polyphenylene ether.

The term styrene polymer in the invention comprises polymers based on styrene, alpha-methylstyrene, or a mixture of styrene and alpha-methylstyrene; analogous considerations apply to the styrene content in SAN, AMSAN, ABS, ASA, MBS, and MABS (see below).

Preference is given to the following as styrene polymers: glassclear polystyrene (GPPS), high-impact polystyrene (HIPS), anionically polymerized polystyrene or high-impact polystyrene (ALPS), styrene-alpha-methylstyrene copolymers, acrylonitrile-butadiene-styrene polymers, (ABS), styrene-acrylonitrile copolymers (SAN), acrylonitrile-alpha-methylstyrene copolymers (AMSAN), acrylonitrile-styrene-acrylate (ASA), methyl methacrylate-butadiene-styrene (MBS), methyl methacrylate-acrylonitrile-butadiene-styrene (MABS) polymers, and mixtures thereof, or with polyphenylene ether (PPE).

It is also possible to admix polymer recyclates of the abovementioned thermoplastic polymers, in particular styrene polymers and expandable styrene polymers (EPS), in amounts which do not substantially impair the properties of these materials, generally in amounts of at most 50% by weight, in particular in amounts of from 1 to 20% by weight (based on component A2)).

To produce the pelletized material of the invention, a melt of component A1) and optionally A2) is impregnated with the blowing agent component B).

A suitable blowing agent component B) is one or more physical blowing agents, in particular organic blowing agents, such as aliphatic hydrocarbons having from 2 to 7 carbon atoms, alcohols, ethers, carbonyl compounds, such as ketones, or halogenated hydrocarbons, and/or $CO_2$. It is preferable to use isopentane, n-pentane, neopentane, isobutane, n-butane, ethanol, and isopropanol, particularly isopentane, n-pentane, and neopentane, or else a mixture of two or more of said isomers, e.g. a mixture made of n- and isopentane. Preference is also given to mixtures made of at least two physical blowing agents. The polymer melt containing blowing agent generally comprises, based on the polymer melt containing blowing agent, a total proportion of from 0.1 to 10% by weight, preferably from 0.5 to 10% by weight, particularly preferably from 2.5 to 8% by weight, of blowing agent component in homogeneous dispersion.

The bulk density of the pelletized materials of the invention is generally up to 900 g/l, preferably in the range from 400 to 800 g/l, particularly preferably in the range from 500 to 700 g/l. When fillers are used, bulk densities in the range greater than 900 g/l can occur, depending on the nature and amount of the filler.

Further additives and auxiliaries can be added, alongside the blowing agent component and water. Preference is given here to use of the additives and auxiliaries optionally already comprised in the polymer composition, and it is therefore possible to use talc powder as nucleating agent.

To produce the pelletized material of the invention, and the moldable foam obtained therefrom, the blowing agent is incorporated by mixing directly into the polymer melt at elevated pressures, and/or a polymer material already impregnated with the blowing agent is melted. A possible process comprises the stages of a) melt production, b) introduction and mixing of the blowing agents, c) optionally cooling, d) conveying, e) pelletization, and f) expansion. Each of the stages a) to e) can be conducted by using the apparatuses or apparatus combinations known in plastics processing. The polymer melt can be taken directly from a polymerization reactor, or can be produced directly in the mixing extruder or in a separate compounding extruder via melting of polymer pellets. Suitable equipment for mixing to incorporate the blowing agents is static mixers or dynamic mixers, for example extruders. Cooling of the melt can optionally be undertaken in order to establish the desired melt temperature. Suitable equipment for this is the mixing assemblies used, or the separate coolers, or heat exchangers. The pelletization process advantageously takes place via pressurized underwater pelletization. Expansion of the melt containing blowing agent on exit from the die is thus completely or at least to some extent suppressed. The pressure increase for the die of the pelletization process can be achieved by using the mixing assembly (extruder) per se or an additional melt assembly that increases pressure. It is preferable to use a gear pump. Examples of suitable arrangements of apparatus for carrying out the process are as follows, with no restriction thereto:
a) polymerization reactor—static mixer/cooler—gear pump—pelletizer
b) polymerization reactor—melt extruder—gear pump—pelletizer
c) extruder—static mixer—pelletizer
d) extruder—static mixer—gear pump—pelletizer
e) extruder—pelletizer
f) extruder—static mixer—gear pump—pelletizer
g) extruder—gear pump—static mixer/heat exchanger—gear pump—pelletizer
h) extruder—static mixer—gear pump—static mixer/heat exchanger—gear pump—pelletizer The arrangement can moreover have one or more ancillary extruders or ancillary feeds for introduction of further polymers and additives, e.g. of solids or heat-sensitive additives. It is also possible to inject liquid additives at any location within the process, preferably in the region of the static and dynamic mixing assemblies.

The temperature at which the polymer melt containing blowing agent is generally conveyed through the die plate is in the range from 120 to 400° C., preferably between 160 to 350° C., particularly preferably in the range from 170 to 300° C.

The die plate is preferably heated to at least 10° C. above the crystallization temperature or—if this is higher—the glass transition temperature of the polymer melt containing blowing agent, in order to avoid polymer deposits in the dies and to ensure problem-free pelletization. It is preferable that the temperature of the die plate is in the range from 10 to 200° C., particularly preferably from 10 to 120° C., above the crystallization temperature of the polymer melt containing blowing agent.

In order to obtain marketable pellet sizes, the diameter (D) of the die apertures at the exit from the die should be in the range from 0.2 to 2.0 mm, preferably in the range from 0.3 to 1.5 mm, particularly preferably in the range from 0.3 to 1.0 mm. This also permits controlled adjustment to pellet sizes below 2.5 mm after die swell, in particular in the range from 0.4 to 1.5 mm.

Particular preference is given to a process comprising the following steps for the production of a pelletized material of the invention:
a) production or provision of a melt of polymer components A1) and optionally A2),
b) mixing to incorporate at least one blowing agent component and optionally additives, such as water or talc powder, into the polymer melt by means of static or dynamic mixer at a temperature of at least 150° C.,
c) thermal homogenization and optionally cooling of the melt comprising blowing agent and polymer to a temperature of at least 120° C.,
d) discharge through a die plate with apertures, the diameter of which at the exit from the die is at most 1.5 mm,
e) underwater pelletization of the melt containing blowing agent directly behind the die plate at a pressure in the range from 1 to 20 bar, and
f) prefoaming of the resultant pelletized material to give a moldable foam.

Step (f) of the process of the invention is usually chronologically separate from steps (a) to (e), for example being carried out at a user's premises.

As an alternative, the treatment of the polymer(s) with blowing agent can also take place in the non-molten state, for example under pressure in an autoclave. For this, by way of example, polymer beads are used as initial charge in an autoclave, and are impregnated or saturated with the physical blowing agent (e.g. with an organic blowing agent, such as pentane). Once the autoclave has been depressurized, the impregnated polymer beads are heated for the preexpansion process.

The invention also provides an expandable pelletized material of the invention, obtainable via
a) production or provision of a melt of polymer components A1) and optionally A2),
b) mixing to incorporate physical blowing agent component B) and optionally one or more additives C) into the melt,
c) extrusion, and
d) underwater pelletization of the melt containing blowing agent, preferably under elevated pressure at from 1 to 20 bar.

The pelletized materials of the invention can be prefoamed in a first step by means of hot air or steam—in what are known as prefoamers—by single or repeated prefoaming to give the foam beads of the invention with a density in the range from 10 to 300 g/l, in particular from 20 to 200 g/l, and, in a second step, in a closed mold, they can be fused to give foam moldings (made from moldable foam). For this, the prefoamed beads are introduced into molds which do not give a gastight seal, and are treated with steam (for example at from 1.8 to 3.2 bar). The moldings can be removed after cooling.

The pelletized materials of the invention can comprise, based on the polymer matrix, from 0 to 50% by weight, in particular up to 40% by weight, preferably up to 30% by weight, of further additives C).

In order to stabilize the extrusion procedure, the pelletized material of the invention can comprise compounds which increase molecular weight, for example chain extenders and/or chain-branching agents, and/or crosslinking agents. Examples are amines, carboxy compounds, carbodilmides, oxazolines, epoxy-functionalized compounds, and compounds containing maleic anhydride groups, where these are used in the form of low-molecular-weight compounds and/or of functionalized polymers, for example based on styrene or on acrylate. Examples of suitable compounds are those marketed by BASF SE with Joncryl® ADR trademarks.

Examples of crosslinking agents that can be added are water-soluble homopolymers based on acrylic acid, for example those obtainable from BASF SE with Sokalan® PA trademarks.

Examples of conventional additives C) are amounts of up to 40% by weight, preferably up to 30% by weight, of elastomeric polymers (also often termed impact modifiers, elastomers, or rubbers).

These very generally involve copolymers, which are preferably composed of at least two of the following monomers: ethylene, propylene, butadiene, isobutene, isoprene, chloroprene, vinyl acetate, styrene, acrylonitrile, and acrylates and, respectively, methacrylates having from 1 to 18 carbon atoms in the alcohol component.

Polymers of this type are described, for example, in Houben-Weyl, Methoden der organischen Chemie, Vol. 14/1 (Georg Thieme Verlag, Stuttgart, 1961), pages 392 to 406, and in the monograph by C. B. Bucknall, "Toughened Plastics" (Applied Science Publishers, London, 1977).

Some preferred types of such elastomers are described below.

Preferred types of such elastomers are those known as ethylene-propylene (EPM) and ethylene-propylene-diene (EPDM) rubbers.

EPM rubbers generally have practically no residual double bonds, whereas EPDM rubbers may have from 1 to 20 double bonds per 100 carbon atoms.

Examples which may be mentioned of diene monomers for EPDM rubbers are conjugated dienes, such as isoprene and butadiene, non-conjugated dienes having from 5 to 25 carbon atoms, such as 1,4-pentadiene, 1,4-hexadiene, 1,5-hexadiene, 2,5-dimethyl-1,5-hexadiene and 1,4-octadiene, cyclic dienes, such as cyclopentadiene, cyclohexadienes, cyclooctadienes and dicyclopentadiene, and also alkenyl-norbornenes, such as 5-ethylidene-2-norbornene, 5-butylidene-2-norbornene, 2-methallyl-5-norbornene and 2-isopropenyl-5-norbornene, and tricyclodienes, such as 3-methyltricyclo[5.2.1.0$^{2,6}$]-3,8-decadiene, or a mixture of these. Preference is given to 1,5-hexadiene, 5-ethylidenenorbornene and dicyclopentadiene. The diene content of the EPDM rubbers is preferably from 0.5 to 50% by weight, in particular from 1 to 8% by weight, based on the total weight of the rubber.

EPM and EPDM rubbers may preferably also have been grafted with reactive carboxylic acids or with derivatives of these. Examples of these are acrylic acid, methacrylic acid and derivatives thereof, e.g. glycidyl(meth)acrylate, and also maleic anhydride.

Copolymers of ethylene with acrylic acid and/or methacrylic acid and/or with the esters of these acids are another group of preferred rubbers. The rubbers may also comprise dicarboxylic acids, such as maleic acid and fumaric acid, or derivatives of these acids, e.g. esters and anhydrides, and/or monomers comprising epoxy groups. These monomers comprising dicarboxylic acid derivatives or comprising epoxy groups are preferably incorporated into the rubber by adding to the monomer mixture monomers comprising dicarboxylic acid groups and/or epoxy groups and having the general formula I or II or III or IV

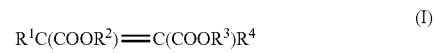

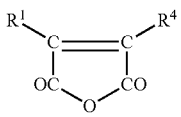

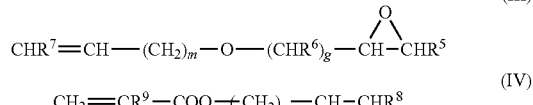

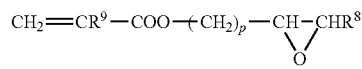

where $R^1$ to $R^9$ are hydrogen or alkyl groups having from 1 to 6 carbon atoms, and m is a whole number from 0 to 20, g is a whole number from 0 to 10 and p is a whole number from 0 to 5.

The $R^1$ to $R^9$ radicals are preferably hydrogen, where m is 0 or 1 and g is 1. The corresponding compounds are maleic acid, fumaric acid, maleic anhydride, allyl glycidyl ether and vinyl glycidyl ether.

Preferred compounds of the formulae I, II and IV are maleic acid, maleic anhydride and (meth)acrylates comprising epoxy groups, such as glycidyl acrylate and glycidyl methacrylate, and the esters with tertiary alcohols, such as tert-butyl acrylate. Although the latter have no free carboxy groups, their behavior approximates to that of the free acids and they are therefore termed monomers with latent carboxy groups.

The copolymers are advantageously composed of from 50 to 98% by weight of ethylene, from 0.1 to 20% by weight of monomers comprising epoxy groups and/or methacrylic acid and/or monomers comprising anhydride groups, the remaining amount being (meth)acrylates.

Particular preference is given to copolymers composed of from 50 to 98% by weight, in particular from 55 to 95% by weight, of ethylene,
from 0.1 to 40% by weight, in particular from 0.3 to 20% by weight, of glycidyl acrylate and/or glycidyl methacrylate, (meth)acrylic acid and/or maleic anhydride, and
from 1 to 45% by weight, in particular from 10 to 40% by weight, of n-butyl acrylate and/or 2-ethylhexyl acrylate.

Other preferred (meth)acrylates are the methyl, ethyl, propyl, isobutyl and tert-butyl esters.

Besides these, comonomers which may also be used are vinyl esters and vinyl ethers.

The ethylene copolymers described above may be produced by processes known per se, preferably by random copolymerization at high pressure and elevated temperature. Appropriate processes are well known.

Other preferred elastomers are emulsion polymers whose production is described, for example, by Blackley in the monograph "Emulsion polymerization". The emulsifiers and catalysts which can be used are known per se.

In principle it is possible to use homogeneously structured elastomers or those with a shell structure. The shell-type structure is determined by the sequence of addition of the individual monomers. The morphology of the polymers is also affected by this sequence of addition.

Monomers which may be mentioned here, merely as examples, for the production of the rubber fraction of the elastomers are acrylates, such as n-butyl acrylate and 2-ethylhexyl acrylate, corresponding methacrylates, butadiene and isoprene, and also mixtures of these. These monomers may be copolymerized with other monomers, such as styrene, acrylonitrile, vinyl ethers and with other acrylates or methacrylates, such as methyl methacrylate, methyl acrylate, ethyl acrylate or propyl acrylate.

The soft or rubber phase (with a glass transition temperature of below 0° C.) of the elastomers may be the core, the outer envelope or an intermediate shell (in the case of elastomers whose structure has more than two shells). Elastomers having more than one shell may also have more than one shell made from a rubber phase.

If one or more hard components (with glass transition temperatures above 20° C.) are involved, besides the rubber phase, in the structure of the elastomer, these are generally produced by polymerizing, as principal monomers, styrene, acrylonitrile, methacrylonitrile, α-methylstyrene, p-methylstyrene, or acrylates or methacrylates, such as methyl acrylate, ethyl acrylate or methyl methacrylate. Besides these, it is also possible to use relatively small proportions of other comonomers here.

It has proven advantageous in some cases to use emulsion polymers which have reactive groups at the surface. Examples of groups of this type are epoxy, carboxy, latent carboxy, amino and amide groups, and also functional groups which may be introduced by concomitant use of monomers of the general formula

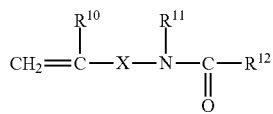

where the definitions of the substituents can be as follows:
$R^{10}$ hydrogen or a $C_1$-$C_4$-alkyl group,
$R^{11}$ hydrogen, a $C_1$-$C_8$-alkyl group or an aryl group, in particular phenyl,
$R^{12}$ hydrogen, a $C_1$-$C_{10}$-alkyl group, a $C_6$-$C_{12}$-aryl group, or —$OR^{13}$
$R^{13}$ a $C_1$-$C_8$-alkyl group or a $C_6$-$C_{12}$-aryl group, optionally with substitution by O- or N-containing groups,
X a chemical bond or a $C_1$-$C_{10}$-alkylene group, or a $C_6$-$C_{12}$-arylene group, or

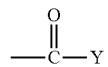

Y O—Z or NH—Z, and
Z a $C_1$-$C_{10}$-alkylene group or a $C_6$-$C_{12}$-arylene group.

The graft monomers described in EP-A 208 187 are also suitable for introducing reactive groups at the surface.

Other examples which may be mentioned are acrylamide, methacrylamide and substituted acrylates or methacrylates, such as (N-tert-butylamino)ethyl methacrylate, (N,N-dimethylamino)ethyl acrylate, (N,N-dimethylamino)methyl acrylate and (N,N-diethylamino)ethyl acrylate.

The particles of the rubber phase may also have been crosslinked. Examples of crosslinking monomers are 1,3-butadiene, divinylbenzene, diallyl phthalate and dihydrodicyclopentadienyl acrylate, and also the compounds described in EP-A 050 265.

It is also possible to use the monomers known as graft-linking monomers, i.e. monomers having two or more polymerizable double bonds which react at different rates during the polymerization. Preference is given to the use of compounds of this type in which at least one reactive group polymerizes at about the same rate as the other monomers, while the other reactive group (or reactive groups), for example, polymerize(s) significantly more slowly. The different polymerization rates give rise to a certain proportion of unsaturated double bonds in the rubber. If another phase is then grafted onto a rubber of this type, at least some of the double bonds present in the rubber react with the graft monomers to form chemical bonds, i.e. the phase grafted on has at least some degree of chemical bonding to the graft base.

Examples of graft-linking monomers of this type are monomers comprising allyl groups, in particular allyl esters of ethylenically unsaturated carboxylic acids, for example allyl acrylate, allyl methacrylate, diallyl maleate, diallyl fumarate and diallyl itaconate, and the corresponding monoallyl compounds of these dicarboxylic acids. Besides these there is a wide variety of other suitable graft-linking monomers. For further details reference may be made here, for example, to U.S. Pat. No. 4,148,846.

The proportion of these crosslinking monomers in the impact-modifying polymer is generally up to 5% by weight, preferably not more than 3% by weight, based on the impact-modifying polymer.

Some preferred emulsion polymers are listed below. Mention may first be made here of graft polymers with a core and with at least one outer shell, and having the following structure:

| Type | Monomers for the core | Monomers for the envelope |
|---|---|---|
| I | 1,3-butadiene, isoprene, n-butyl acrylate, ethylhexyl acrylate, or a mixture of these | styrene, acrylonitrile, methyl methacrylate |
| II | as I, but with concomitant use of crosslinking agents | as I |
| III | as I or II | n-butyl acrylate, ethyl acrylate, methyl acrylate, 1,3-butadiene, isoprene, ethylhexyl acrylate |
| IV | as I or II | as I or III, but with concomitant use of monomers having reactive groups, as described herein |
| V | styrene, acrylonitrile, methyl methacrylate, or a mixture of these | first envelope made of monomers as described under I and II for the core, second envelope as described under I or IV for the envelope |

These graft polymers, in particular ABS polymers and/or ASA polymers, are preferably used in amounts of up to 40% by weight for impact-modification of PBT, optionally in a mixture with up to 40% by weight of polyethylene terephthalate. Appropriate blend products are obtainable with trademark Ultradur®S (previously Ultrablend®S from BASF AG).

Instead of graft polymers whose structure has more than one shell, it is also possible to use homogeneous, i.e. single-shell, elastomers made from 1,3-butadiene, isoprene and n-butyl acrylate or from copolymers of these. These products, too, may be produced by concomitant use of crosslinking monomers or of monomers having reactive groups.

Examples of preferred emulsion polymers are n-butyl acrylate-(meth)acrylic acid copolymers, n-butyl acrylate-glycidyl acrylate or n-butyl acrylate-glycidyl methacrylate copolymers, graft polymers with an inner core made from n-butyl acrylate or based on butadiene and with an outer envelope made from the abovementioned copolymers, and copolymers of ethylene with comonomers which supply reactive groups.

The elastomers described can also be produced by other conventional processes, e.g. via suspension polymerization.

Preference is likewise given to silicone rubbers, as described in DE-A 37 25 576, EP-A 235 690, DE-A 38 00 603 and EP-A 319 290.

It is also possible, of course, to use a mixture of the types of rubber listed above.

Fibrous or particulate fillers C) that may be mentioned are carbon fibers, glass fibers, glass beads, amorphous silica, asbestos, calcium silicate, calcium metasilicate, magnesium carbonate, kaolin, chalk, powdered quartz, mica, barium sulfate, and feldspar, the amounts of these used being up to 50% by weight, in particular up to 40% by weight.

Preferred fibrous fillers that may be mentioned are carbon fibers, aramid fibers, and potassium titanate fibers, and particular preference here is given to glass fibers in the form of E glass. These can be used in the form of rovings or in the commercially available forms of chopped glass.

The fibrous fillers can have been surface-pretreated with a silane compound in order to improve compatibility with the thermoplastic.

Suitable silane compounds are those of the general formula

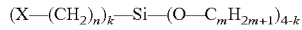

where the definitions of the substituents are as follows:
X $NH_2$—,

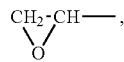

HO—,
n is an integer from 2 to 10, preferably from 3 to 4
m is an integer from 1 to 5, preferably from 1 to 2
k is an integer from 1 to 3, preferably 1.

Preferred silane compounds are aminopropyltrimethoxysilane, aminobutyltrimethoxysilane, aminopropyltriethoxysilane, aminobutyltriethoxysilane, and also the corresponding silanes which comprise a glycidyl group as substituent X.

The amounts of the silane compounds generally used for surface coating are from 0.05 to 5% by weight, preferably from 0.5 to 1.5% by weight, and in particular 0.8 to 1% by weight (based on C).

Acicular mineral fillers are also suitable.

For the purposes of the invention, acicular mineral fillers are a mineral filler with pronounced acicular character. An example that may be mentioned is acicular wollastonite. The L/D (length to diameter) ratio of the mineral is preferably from 8:1 to 35:1, with preference from 8:1 to 11:1.

The mineral filler can optionally have been pretreated with the abovementioned silane compounds; however, the pretreatment is not essential.

Further fillers that may be mentioned are kaolin, calcined kaolin, wollastonite, talc powder, and chalk.

The thermoplastic molding compositions of the invention can comprise, as component C), conventional processing aids, such as stabilizers, oxidation retarders, agents to counteract decomposition by heat and decomposition by ultraviolet light, lubricants and mold-release agents, colorants, such as dyes and pigments, nucleating agents, plasticizers, etc.

Examples of oxidation retarders and heat stabilizers are sterically hindered phenols, and/or phosphites, hydroquinones, aromatic secondary amines, such as diphenylamines, and various substituted members of said groups, and mixtures of these, in concentrations up to 1% by weight, based on the weight of the thermoplastic molding compositions.

UV stabilizers that may be mentioned are various substituted resorcinols, salicylates, benzotriazoles, and benzophenones, the amounts used of these generally being up to 2% by weight, based on the molding composition.

Colorants that can be added comprise inorganic pigments, such as titanium dioxide, ultramarine blue, iron oxide, and carbon black, and also organic pigments, such as phthaiocyanines, quinacridones, perylenes, and also dyes, such as nigrosin, and anthraquinones.

Nucleating agents that can be used are sodium phenylphosphinate, aluminum oxide, silicon dioxide, and also preferably talc powder.

The usual amounts used of further lubricants and mold-release agents are up to 1% by weight. Preference is given to long-chain fatty acids (e.g. stearic acid or behenic acid), salts thereof (e.g. Ca stearate or Zn stearate), or montan waxes (mixtures of straight-chain, saturated carboxylic acids having chain lengths of from 28 to 32 carbon atoms), and also to Ca or Na montanate, and also to low-molecular-weight polyethylene waxes and low-molecular-weight polypropylene waxes.

Examples of plasticizers that may be mentioned are dioctyl phthalate, dibenzyl phthalate, butyl benzyl phthalate, hydrocarbon oils, and N-(n-butyl)benzene-sulfonamide.

The molding compositions of the invention can also comprise from 0 to 2% by weight of fluorinated ethylene polymers. These involve polymers of ethylene having from 55 to 76% by weight fluorine content, preferably from 70 to 76% by weight.

Examples of these are polytetrafluoroethylene (PTFE), tetrafluoroethylene-hexafluoropropylene copolymers, and tetrafluoroethylene copolymers with relatively small proportions (generally up to 50% by weight) or copolymerizable ethylenically unsaturated monomers. These are described by way of example by Schildknecht in "Vinyl and Related Polymers", Wiley-Verlag, 1952, pp. 484 to 494, and by Wall in "Fluorpolymers" (Wiley Interscience, 1972).

These fluorinated ethylene polymers have homogeneous distribution in the pelletized materials and their d50 (number-average) particle size is preferably in the range from 0.05 to 10 μm, in particular from 0.1 to 5 μm. These small particle sizes can particularly preferably be achieved via use of aqueous dispersions of fluorinated ethylene polymers and incorporation of these into a polyester melt.

Pelletized materials of the invention have very good shelf life: the polymer can be foamed even after more than 8 months, still giving low densities similar to those obtained directly after production of the expandable pelletized polymer material.

The resultant foams feature a particular property profile which is novel for molded foams:
high solvent resistance
good adhesion and stability with adhesives and resins, for example epoxy systems
good metal adhesion
coatability
high surface gloss
energy absorption at low and high temperatures
possibility of modification with halogen-free flame retardants
high long-term usage temperatures good, almost constant mechanical properties over a wide temperature range.

The pelletized materials and moldable foams of the invention are suitable for use by way of example in the automobile industry, airline industry, construction industry, packaging industry, sports and leisure industry, in transport, in engineering, in lightweight construction, and/or in composite construction.

Preference is given to the use for thermal insulation, in particular in the construction industry.

Pelletized materials and moldable foams of the invention, where these comprise flame retardant, are suitable for applications which require compliance with flame retardancy rules.

Preferred applications are:
- automobile (e.g. interior cladding, dashboards, load-bearing foam components, and foam cores in sandwich materials and/or in composite materials)
- high-temperature insulation in transport, in the industrial sector, for example in superheated-steam lines, and in technology relating to residential and other buildings, examples being boilers
- rotor blades in windpower systems (where in particular it is the heat resistance and solvent resistance that is important for the production of composite materials)
- façade components exposed to high temperatures
- packaging material with high-temperature resistance.

The examples provide further explanation of the invention but do not restrict same.

EXAMPLES

A General Methods a) Intensified Process

Prior to processing, all of the polymers were dried in vacuo for at least 4 h at 80° C. The polyester, the polycarbonate, and also the further components, such as masterbatches comprising flame retardants and talc powder, were charged, without heating, in a corotating-screw extruder (Leistritz, screw diameter 18 mm, screw length 40 D). The extruder was operated with a screw speed of about 95 revolutions/min. By virtue of the structure of the screw, all of the polymers were melted, and further additives were incorporated homogeneously into the melt. The physical blowing agents, in particular isopentane, were added to the extruder along the length of the screw, and mixed with the melt, or dissolved therein. Total throughput was 3 kg/h.

The entire mixture was pressurized by way of an ingoing-pressure-controlled gear pump installed at the outlet of the extruder (ingoing pressure 140 bar), and thus passed through a bypass valve and an exit die for the pelletization of the material (die diameter 0.75 mm, one die aperture, die temperature about 300° C.). The temperature of the melt prior to the pelletization process was from 250 to 280° C., depending on the material used. The material was pelletized under water pressure (12 bar) at relatively low water temperatures (about 70° C.), in order to avoid premature foaming. The resultant pressure of the melt at the exit die was from 180 to 300 bar, depending on the material used. The resultant average particle size of the expandable pelletized material was about 1.25 mm.

Examples 1 to 12 were carried out by this process.

b) Mixer Process

Prior to processing, all of the polymers were dried in vacuo for at least 4 h at 80° C. The polyester, the polycarbonate, and also the further components, such as masterbatches comprising flame retardants and talc powder, were charged, without heating, to a corotating-screw extruder (Leistritz, screw diameter 18 mm, screw length 40 D). The extruder was operated with a screw speed of about 100 revolutions/min. By virtue of the structure of the screw, all of the polymers were melted, and further additives were incorporated homogeneously into the melt. The melt was then passed through a sequence of static mixers and heat exchangers, and the physical blowing agent(s), in particular isopentane, was/were added in the first static mixer. By virtue of the structure of the mixer, the physical blowing agents were dissolved in the melt, and the mixture was cooled. Total throughput was 3 kg/h.

The entire mixture was pressurized by way of an ingoing-pressure-controlled gear pump installed at the outlet of the extruder (ingoing pressure 140 bar), and thus passed through a bypass valve and an exit die for the pelletization of the material (die diameter 0.75 mm, one die aperture, die temperature about 280° C.). The temperature of the melt prior to the pelletization process was from 250 to 280° C., depending on the material used. The material was pelletized under water pressure (12 bar) at relatively low water temperatures (about 70° C.), in order to avoid premature foaming. The resultant pressure of the melt at the exit die was from 180 to 300 bar, depending on the material used. The resultant average particle size of the expandable pelletized material was about 1.25 mm.

Examples 13 and 14 were carried out by this process.

B Materials Used

Component A: Polycarbonate based on bisphenol A (Makrolon® 2800, Bayer Material Science AG, Leverkusen)
Component B: Polybutylene terephthalate (Ultradur® 4520, BASF SE, Ludwigshafen)
Component C: Polyethylene terephthalate (Invista 1101, Invista S. à.r.l., Wichita)
Component D: Polylactic acid (PLA 8051 D, Natureworks LLC, Minnetonka, USA)
Component E: PBST (Ecoflex® FBX 7011, BASF SE, Ludwigshafen)
Component F: Blowing agent: isopentane (purity 95%, Halternann Products GmbH, Speyer)
Component G: Nucleating agent: talc (IT Extra, Mondo Mineral's, Amsterdam)
Component H: Aluminum diethylphosphinate (Exolit® OP 1230, Clariant, Muttenz)
Component I: Flame retardant: triphenyl phosphate (Disflamol® TP [2] (Lanxess AG, Leverkusen)

Example 1

79.2 parts by weight of polycarbonate (Makrolon® 2800) were melted together with 19.8 parts by weight of polybutylene terephthalate (Ultradur® 4520), and 1 part by weight of talc (IT Extra) was admixed as nucleating agent in the twin-screw extruder. The polymer melt was then loaded with 2.5 parts by weight (based on 100 parts by weight of the polymer-additive mixture) of isopentane, and then homogenized in the extruder. After the homogenization process, the polymer melt was extruded through a heated pelletizing die. The polymer extrudate was pelletized by underwater pelletization to give a pelletized material loaded with blowing agent and having narrow particle size distribution. The density of the beads of the pelletized material loaded with blowing agent is from 500 to 600 g/l.

The pelletized material containing blowing agent was expanded in an EPS prefoamer at a pressure of from 1.5 to 2.0 bar to give foam beads with the bulk density stated in table 1:

182 g/l. The pressing process took place in an EPP molding machine at a gauge pressure of from 1.6 to 2.4 bar.

The moldings of examples 2 to 5 were produced analogously, and table 1 lists the constitution and bulk density of these.

TABLE 1

| | Constitution of expandable thermoplastic mixtures (parts by weight) | | | | |
|---|---|---|---|---|---|
| | Ex. 1 | Ex. 2 | Ex. 3 | Ex. 4 | Ex. 5 |
| PC (Makrolon 2800) | 79.2 | 79.2 | 79.2 | 59.4 | 100 |
| PBT (Ultradur 4520) | 19.8 | 19.8 | 19.8 | 39.6 | — |
| Talc | 1.0 | 1.0 | 1.0 | 1.0 | 1.0 |
| Blowing agent content (feed) | 2.5 | 4.5 | 6.0 | 4.5 | 5.0 |
| Glass transition temperature in ° C. | 123 | 118 | 119 | 110 | 132 |
| Melting point(s) in ° C. | 221 213 | 210 218 | 213, 220 | 211 218 | 218 |
| Total enthalpy of fusion in J/g | 13 | 9 | 6 | 20 | 2 |
| Bulk density of foam in g/l | 182 | 18 | 41 | 134 | 85 |

Example 6

94.05 parts by weight of polycarbonate (Makrolon® 2800) were melted together with 4.95 parts by weight of polyethylene terephthalate (Invista 1101), and 1 part by weight of talc (IT Extra) was admixed as nucleating agent in the twin-screw extruder. The polymer melt was then loaded with 4.5 parts by weight (based on 100 parts by weight of the polymer-additive mixture) of isopentane, and then homogenized in the extruder. After the homogenization process, the polymer melt was extruded through a heated pelletizing die. The polymer extrudate was pelletized by underwater pelletization to give a pelletized material loaded with blowing agent and having narrow particle size distribution. The density of the beads of the pelletized material loaded with blowing agent is from 550 to 650 g/l.

Examples 7 to 9

Expandable pelletized materials were produced by analogy with example 6, with the constitutions stated in table 2. The pelletized materials containing blowing agent were expanded in an EPS prefoamer at a pressure of from 1.7 to 2.0 bar to give foam beads with the bulk densities stated in table 2. The pressing process took place in an EPP molding machine at a gauge pressure of from 1.6 to 2.4 bar.

TABLE 2

| | Constitution of expandable thermoplastic mixtures (parts by weight) | | | |
|---|---|---|---|---|
| | Ex. 6 | Ex. 7 | Ex. 8 | Ex. 9 |
| PC (Makrolon 2800) | 94.05 | 79.2 | 79.2 | 89.1 |
| PET (Invista 1101) | 4.95 | 19.8 | — | — |
| PLA (8051 D) | — | — | 19.8 | — |
| PBST (Ecoflex FBX 7011) | — | — | — | 9.9 |
| Talc | 1.0 | 1.0 | 1.0 | 1.0 |
| Blowing agent content (feed) | 4.5 | 4.5 | 4.5 | 4.5 |
| Glass transition temperature in ° C. | 143 | 139 | 56 | 114 |
| Melting point(s) in ° C. | 253 | 251 | 150 | 121, 137 |
| Total enthalpy of fusion in J/g | 0.5 | 6 | 7 | 7 |
| Bulk density (g/l) | 71 | 55 | 78 | 39 |

Example 10

78.4 parts by weight of polycarbonate (Makrolon® 2800) were melted together with 19.8 parts by weight of polybutylene terephthalate (Ultradur® 4520), and the following were admixed in the twin-screw extruder: 1 part by weight of talc (IT Extra) as nucleating agent and 1 part by weight of aluminum diethylphosphinate (Exolit® OP 1230 in polycarbonate masterbatch) as flame retardant. The polymer melt was then loaded with 4.5 parts by weight (based on 100 parts by weight of the polymer-additive mixture) of isopentane, and then homogenized in the extruder. After the homogenization process, the polymer melt was extruded through a heated pelletizing die. The polymer extrudate was pelletized by underwater pelletization to give a pelletized material loaded with blowing agent and having narrow particle size distribution. The density of the beads of the pelletized material loaded with blowing agent is from 500-600 g/l.

The pelletized material containing blowing agent was expanded in an EPS prefoamer at a pressure of from 1.7 to 2.0 bar to give foam beads with a density of from 18 to 25 g/l. The pressing process took place in an EPP molding machine at a gauge pressure of from 1.6 to 2.4 bar.

Table 3 gives the constitution and flame retardancy properties.

Example 11

76.9 parts by weight of polycarbonate (Makrolon® 2800) were melted together with 19.8 parts by weight of polybutylene terephthalate (Ultradur® 4520), and the following were admixed in the twin-screw extruder: 1 part by weight of talc (IT Extra) as nucleating agent and 3 parts by weight of triphenyl phosphate (Disflamol® TP in polycarbonate masterbatch) as flame retardant. The polymer melt was then loaded with 4.5 parts by weight (based on 100 parts by weight of the polymer-additive mixture) of isopentane, and then homogenized in the extruder. After the homogenization process, the polymer melt was extruded through a heated pelletizing die. The polymer extrudate was pelletized by underwater pelletization to give a pelletized material loaded with blowing agent and having narrow particle size distribution. The density of the beads of the pelletized material loaded with blowing agent was from 500 to 600 g/l.

The pelletized material containing blowing agent was expanded in an EPS prefoamer at a pressure of from 0.25 to 0.7 bar to give foam beads with a density of from 18 to 25 g/l. The pressing process took place in an EPP molding machine at a gauge pressure of from 1.6 to 2.4 bar.

Table 3 gives constitution and flame retardancy properties.

TABLE 3

| | Constitution of expandable thermoplastic mixtures (parts by weight) | | |
|---|---|---|---|
| | Ex. 1 | Ex. 10 | Ex. 11 |
| PC (Makrolon 2800) | 79.2 | 78.4 | 76.9 |
| PBT (Ultradur 4520) | 19.8 | 19.6 | 19.2 |
| Exolit OP 1230 | — | 1.0 | — |
| TPP (Disflamol) | — | — | 3.0 |
| Talc | 1.0 | 1.0 | 1.0 |
| Glass transition temperature in ° C. | 118 | 114 | 115 |
| Melting point(s) in ° C. | 210 218 | 206 | 219 |
| Total enthalpy of fusion in J/g | 9 | 2 | 11 |

TABLE 3-continued

| | Constitution of expandable thermoplastic mixtures (parts by weight) | | |
| --- | --- | --- | --- |
| | Ex. 1 | Ex. 10 | Ex. 11 |
| Blowing agent content (feed) | 4.5 | 4.5 | 4.5 |
| B2 fire test on molded specimen | not self-extinguishing | self-extinguishing | self-extinguishing |

Example 13

79.2 parts by weight of polycarbonate (Makrolon® 2800) were melted together with 19.8 parts by weight of polybutylene terephthalate (Ultradur® 4520), and 1 part by weight of talc (IT Extra) was admixed as nucleating agent in the twin-screw extruder. 2.5 parts by weight (based on 100 parts by weight of the polymer-additive mixture) of isopentane were then fed into the mixture and incorporated by mixing homogeneously into the melt by way of static mixers. After cooling and, respectively, homogenization of the polymer melt in static mixers and heat exchangers, the melt was extruded by way of a gear pump through a heated pelletizing die. The polymer extrudate was pelletized by underwater pelletization to give a pelletized material loaded with blowing agent and having narrow particle size distribution. The density of the beads of the pelletized material loaded with blowing agent is from 500 to 600 g/l.

The pelletized material containing blowing agent was expanded in an EPS prefoamer at a pressure of from 1.5 to 2.0 bar to give foam beads with the bulk density stated in table 1: 182 g/l. The pressing process took place in an EPP molding machine at a gauge pressure of from 1.6 to 2.4 bar.

The moldings of examples 14 to 17 were produced analogously, and table 4 lists the constitution and bulk density of these.

TABLE 4

| | Constitution of expandable thermoplastic mixtures (parts by weight) | | | |
| --- | --- | --- | --- | --- |
| | Ex. 14 | Ex. 15 | Ex. 16 | Ex. 17 |
| PC (Makrolon 2800) | 79.2 | 79.2 | 59.4 | 100 |
| PBT (Ultradur 4520) | 19.8 | 19.8 | 39.6 | — |
| Talc | 1.0 | 1.0 | 1.0 | 1.0 |
| Blowing agent content (feed) | 2.5 | 4.5 | 4.5 | 5.0 |
| Glass transition temperature in ° C. | 120 | 117 | 122 | 133 |
| Melting point(s) in ° C. | 220, 212 | 216, 211 | 217, 212 | 218 |
| Total enthalpy of fusion in J/g | 12 | 8 | 19 | 2 |
| Bulk density of foam in g/l | 175 | 20 | 126 | 89 |

The moldings of examples 18 to 20 were produced analogously, and table 5 lists the constitution and flame retardancy properties of these.

TABLE 5

| | Constitution of expandable thermoplastic mixtures (parts by weight) | | |
| --- | --- | --- | --- |
| | Ex. 18 | Ex. 19 | Ex. 20 |
| PC (Makrolon 2800) | 79.2 | 70.48 | 70.48 |
| PBT (Ultradur 4520) | 19.8 | 17.62 | 17.62 |

TABLE 5-continued

| | Constitution of expandable thermoplastic mixtures (parts by weight) | | |
| --- | --- | --- | --- |
| | Ex. 18 | Ex. 19 | Ex. 20 |
| Fyroflex RDP | — | 4.41 | 4.41 |
| Melapur MC25 | — | 6.61 | 6.61 |
| Talc | 0.99 | 0.88 | 0.88 |
| Blowing agent content (feed) | 4.5 | 4.5 | 4.5 |
| Foamplate density (g/L) | 48 | 48 | 62 |
| Foamplate thickness (mm) | 20 | 20 | 20 |
| B1 fire test (DIN 4102 Teil 1: 1998-05) | failed | passed | passed |

Fyroflex RDP (Supresta Netherlands B.V.): 95-99%: Phosphoric trichloride, polymer with 1,3-benzenediol, phenyl ester
1-5%: Triphenyl phosphate
Melapur MC25 (BASF SE, Ludwigshafen): 1,3,5-Triazine-2,4,6 (1H,3H,5H)-trione compound with 1,3,5-triazine-2,4,6-triamine (1:1)

The invention claimed is:

1. An expandable pelletized material having isotropic mechanical properties comprising
    A) a polymer matrix composed of
        A1) at least 55% by weight of polyester (based on the entirety of components A1) and A2)) based on aromatic or aliphatic dicarboxylic acids and on aliphatic or aromatic dihydroxy compounds and with a total enthalpy of fusion of up to 60 J/g, optionally of one or more melting points in the range from 100 to 300° C. and of one or more glass transition temperatures in the range from 0 to 250° C., and a mixture made of (a) 60 wt.-% to 95 wt.-% of one or more bisphenol A polycarbonates (PC) and (b) one or more polycarboxylic esters selected from polyethylene terephthalate (PET) and polybutylene terephthalate (PBT), and copolyesters thereof, and/or transesterification products of said mixture and
        A2) from 0 to 45% by weight (based on the entirety of components A1) and A2)) of one or more thermoplastic polymers different from component A1);
    B) a physical blowing agent component, and
    C) optionally further additives,
    wherein the bulk density of the expandable pelletized material is from 500 to 900 g/l and wherein the bulk density of the expandable pelletized material can exceed 900 g/l when the material comprises further additives C) as fillers and
    wherein the expandable pelletized material has isotropic mechanical properties.

2. The expandable pelletized material according to claim 1, wherein the glass transition temperature is in the range from 25 to 170° C.

3. The expandable pelletized material according to claim 1, where the total enthalpy of fusion is in the range from 1.5 to 7.5 J/g.

4. The expandable pelletized material according to claim 3 wherein the melting point is in the range from 30 to 290° C.

5. The expandable pelletized material according to claim 1, wherein the polymer matrix A) consists of polyester component A1).

6. The expandable pelletized material according to claim 1, wherein the polymer matrix A) comprises, based on the entirety of components A1) and A2), from 0.1 to 20% by weight of one or more thermoplastic polymers A2).

7. The expandable pelletized material according to claim 6 comprising, as component A2), one or more styrene polymers and/or blends of these with one or more polyphenylene ethers.

8. The expandable pelletized material according to claim 1, wherein the mixture has been selected from PC/PET, PC/PBT, and transesterification products thereof.

9. The expandable pelletized material according to claim 1 comprising, as blowing agent component B), one or more physical blowing agents selected from aliphatic hydrocarbons having from 2 to 7 carbon atoms, alcohols, ethers, carbonyl compounds, halogenated hydrocarbons, and $CO_2$.

10. The expandable pelletized material according to claim 1, comprising, based on the entirety of components A) and B), from 0.1 to 10% by weight of one or more organic physical blowing agents.

11. The expandable pelletized material according to claim 1 comprising, as additives C), from 0.1 to 40% by weight (based on the entirety of components A1), B), and C)), of one or more compounds from the group of the stabilizers, oxidation retarders, agents to counteract decomposition by heat and decomposition by ultraviolet light, lubricants and mold-release agents, dyes, pigments, nucleating agents, plasticizers, flame retardants, and fillers.

12. The expandable pelletized material according to claim 1, comprising one or more flame retardants selected from the group consisting of triphenyl phosphate and aluminum diethylphosphinate.

13. A process for producing the expandable pelletized material according to claim 1 comprising the following steps:
   a) providing the polyester A1) and optionally of polymer component A2) in a molten state,
   b) mixing to incorporate physical blowing agent component B) and optionally one or more additives C) into the melt,
   c) extrusion, and
   d) underwater pelletization of the melt containing blowing agent.

14. The process according to claim 13, wherein the underwater pelletization (d) of the melt containing blowing agent is carried out at elevated pressure.

15. The expandable pelletized material according to claim 1, obtainable via
   a) providing a mixture made of one or more polycarbonates selected from bisphenol A polycarbonate (PC), one or more polycarboxylic esters selected from polyethylene terephthalate (PET), polybutylene terephthalate (PBT), and copolyesters thereof, and/or provision of transesterification products of said mixture,
   b) mixing to incorporate physical blowing agent component B) and optionally one or more additives C) into the melt,
   c) extrusion, and
   d) underwater pelletization of the melt containing blowing agent.

16. The expandable pelletized material according to claim 15, wherein the underwater pelletization (d) of the melt containing blowing agent is carried out at elevated pressure.

17. The expandable pelletized material according to claim 1, wherein the bulk density of the expandable pelletized material is from 500 to 900 g/l.

* * * * *